United States Patent [19]

Coyle

[11] 4,039,645
[45] Aug. 2, 1977

[54] PROCESS FOR THE MANUFACTURE OF FIRE RETARDANT PARTICLEBOARD

[75] Inventor: Robert P. Coyle, Clovis, Calif.

[73] Assignee: Champion International Corporation, Stamford, Conn.

[21] Appl. No.: 620,957

[22] Filed: Oct. 9, 1975

Related U.S. Application Data

[63] Continuation-in-part of Ser. No. 486,686, July 8, 1974, abandoned, which is a continuation-in-part of Ser. No. 356,578, May 2, 1973, abandoned.

[51] Int. Cl.$^2$ .............................................. B29J 5/00
[52] U.S. Cl. .................................. 264/118; 264/109; 428/403; 428/326; 428/407; 428/528
[58] Field of Search ............... 264/109, 122, 123, 118; 161/162; 428/403, 326, 407, 528

[56] References Cited

U.S. PATENT DOCUMENTS 3,321,421   5/1967   Pataki ................................... 161/168

Primary Examiner—Robert F. White
Assistant Examiner—James R. Hall
Attorney, Agent, or Firm—Anthony J. Casella; Joseph Calvaruso

[57] ABSTRACT

A process for manufacturing a unique fire retardant particleboard includes the supersaturation of wood chips, followed by spraying of the wood chips with an aqueous solution of borate and sulfuric acid, after which the sprayed wood chips are allowed to stand for a period of time to become impregnated and saturated with the aqueous solution. The impregnated wood chips are then allowed to dry, after which a urea formaldehyde adhesive is applied to the wood chips, and the chips are consolidated to form the fire resistant wood particleboard.

3 Claims, 1 Drawing Figure

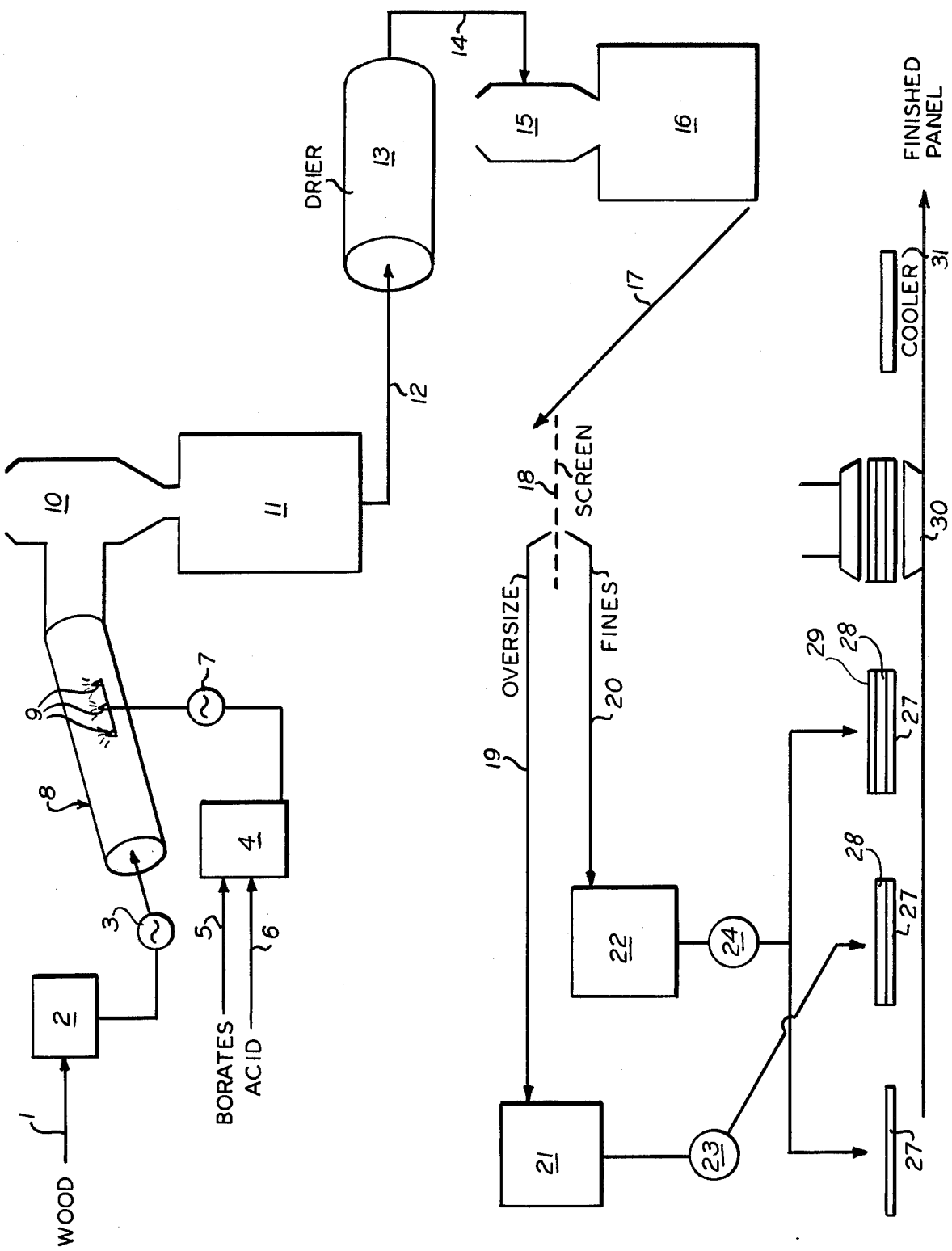

PROCESS FOR THE MANUFACTURE OF FIRE RETARDANT PARTICLEBOARD

The present application is a continuation-in-part application of U.S. application Ser. No. 486,686 now abandoned filed July 8, 1974 which is a continuation-in-part of U.S. application Ser. No. 356,578, now abandoned filed May 2, 1973 entitled "Fire Retardant Particleboard and Process for its Manufacture", inventor: Robert P. Coyle.

The present invention is broadly concerned with a process for making fire retardant particleboard. In accordance with the present invention wood particles are treated with boron compounds such as alkali metal borates in combination with sulfuric acid, prior to their consolidation into a particleboard panel.

It is well known in the art to produce wood particleboard panels by various processes and techniques. In general, particles such as wood particles of various sizes and geometrical configurations, are consolidated using various glue or binder mixes such as urea formaldehyde, phenol formaldehyde, melamine formaldehyde, acid phenol resins, etc., under heat and pressure. Typical processes are described in U.S. Pat. No. 2,642,371 issued June 23, 1953, inventor, Fahrni, entitled "Composite Wooden Board":, and in U.S. Pat. No. 2,686,143, issued Aug. 10, 1954, inventor, Fahrni, entitled "Process for Manufacturing a Composite Wooden Board". The corresponding Canadian Pat. Nos. are numbered 521,695 and 536,289, respectively. The assignee of the present invention is the exclusive licensee in U.S. and Canada under the above patents, the disclosures of which patents are incorporated herein by reference.

It is also known in the art to use with the chips added chemicals designed to reduce the fire hazard of these products. Many compounds have been suggested and used in order to meet various fire underwriters tests such as the 25 foot tunnel flame spread rating. Smoke rating tests must also be met in many installations for these products. Typical patents covering developments in this field are U.S. Pat. No. 3,383,274 (Canadian Pat. No. 759,866 ), issued May 14, 1968, inventor: Craig, entitled "Flame Proofing of Construction Materials", and U.S. Pat. No. 3,360,822, issued Dec. 28, 1971, inventor: Carmellini, entitled "Accoustical and Fire Resistant Particleboard". These patents are assigned to the assignee of the present invention and their disclosures are incorporated herein by reference.

It is also known in the art to use borates to produce so-called "Borate Fire Retardant Systems", by various processes. One method used is to treat the green chips with Polybor* sodium borate, ($Na_2B_8O_{13} \cdot 4H_2O$), either in solution or as a dry powder. It is then conventional to add powdered boric acid, ($H_3BO_3$), into the resin mix prior to using the resin mix to consolidate the treated wood chips. The addition of the boric acid to the glue mix is required since all sodium borates such as $Na_2B_8O_{13} \cdot 4H_2O$ have a relatively high pH such as about 7 which retards the cure cycle particularly when using a urea-formaldehyde resin. This retarding effect is compensated to some extent by the addition of a strongly buffered catalyst such as boric acid to the glue mix. Boric acid in the glue mix tends to alter the wood-resin interface pH and thus allow the normal cure cycle.

*Reg. Tm of U.S. Borax and Chem. Corp. Los Angeles, Calif.

Certain troublesome problems are, however, encountered when the boric acid is added to the glue mix is dictated by the viscosity of the resin which can be handled by the resin spray system. Also great difficulty is encountered in securing a uniform distribution of the boric acid throughout the resin system particularly a urea-formaldehyde system. High speed expensive mixing equipment is required to secure a satisfactory dispersion of the powdered boric acid. Also, since the solubility of the boric acid in this system is slight, the greater amount of the boric acid will remain in suspension, thus causing difficulty in spraying, and plug-ups in the spray system. Furthermore, when using boric acid in the resin mix, it is necessary to increase the resin content of the finished board to compensate for the poor resin distribution due to the larger nozzles needed to spray the boric acid suspension.

The present invention overcomes these disadvantages and produces a high quality fire retardant particleboard using a borate in conjunction with sulfuric acid, in the direct treatment of the green chips. The resin mix, especially a urea formaldehyde resin mix, is not diluted with boric acid and thereby is more stable and more effective in permitting the use of less resin, all other factors being equal. Also, the expensive step heretofore required of adding boric acid to the resin mix to secure a borate system fire retardant particleboard is eliminated.

The present invention may be more fully understood by reference to the drawing which diagramatically illustrates one embodiment of the same. Referring to the drawing, raw wood finish is introduced into grinder or flaker 2 as illustrated by line 1. The flakes or chips are then passed through a blower 3 into a section of a blow pipe 8.

The chips may be of any size and configuration as those known in the art for the manufacture of particleboards. They may, for example, have lengths of about 5 to 50mm., widths of about 5 to 10mm., and thicknesses of from 1 to 5mm. It is preferred that the chips have a moisture content above about 100%, such as about 125% to 150%, as for example, of about 135% based on the dry wood.

In blow pipe apparatus 8 the flakes are sprayed with fire retardant solution from spray nozzles 9 or equivalent applicators. The fire retardant solution comprises a borate, preferably a mixture of borates introduced into storage tank 4 by means of line 5 and sulfuric acid introduced by means of line 6. The fire retardant solution is passed to nozzles 9 by means of pump 7.

As mentioned above, the fire retardant solution comprises a borate, or a mixture of borates and sulfuric acid. Boric acid is not satisfactory for application to the green chips since the chips can absorb no more than about 5% boric acid. Above this quantity the excess boric acid falls away from the chips surfaces. The preferred acid is sulfuric acid, preferably 90% – 98%, such as about 96% concentration.

The borate may be selected from the class consisting of borax decahydrate ($Na_2B_4O_4 \cdot 10H_2O$), borax dehydrated ($Na_2B_4O_7$), borax pentahydrate ($Na_2B_4O_7 \cdot 5H_2O$), and Polybor ($Na_2B_8O_{13} \cdot 4H_2O$), or salts or meta or ortho boric acids. Thus, a preferred fire retardant spraying solution is a borax $Na_2 B_4O_7 \cdot XH_2O$ where X can be 5, 10 or 0 and 96% sulfuric acid present in the weight ratio of from about 1.5 to 4.0 borax to 1 of sulfuric acid, preferably a weight ratio of about 2 ½ to 1.

A desirable ratio is about 52 parts by weight of anhydrous borax (or equivalent parts of borax penta or borax deca hydrate) to 15 to 25 parts of 96% sulfuric acid. A much preferred ratio is 52 parts of anhydrous borax to 21 parts of 96% sulfuric acid. The pH of the fire retardant solution is in the range of about 4.5 to 6.0, preferably 5.0 to 5.5, such as about 5.25. The solution is adjusted to 30 – 50% solids, such as 40% by weight with water and heated to a temperature in the range of about 150° F to 225° F, such as about 170° F when sprayed on the chips.

The treated chips then continue through the blowpipe to a cyclone 10 and then to a wet storage bin 11. After some stand time over ten minutes, preferably ten to twenty minutes, in the bin or silo, the wet chips or particles are fed into a dryer 13 by means of either a blowpipe-cyclone setup (not shown)or a conveyor 12. The wet storage or conditioning bin 11 permits the chips to become thoroughly impregnated and saturated with the fire retardant solution. After drying to a moisture content of about 3% to 7%, such as 5%, the chips are taken through a blowpipe 14 to a cyclone 15 and then into a dry storage silo 16. From here the chips are conveyed by blowpipe or conveyor belt 17 to a screen 18 where the fines 20 are separated from the oversize particles 19; the fines are sent to a fine storage silo 22, then through a glue applicator 24 and spread as face layers 27 and 29. The oversized are stored in 21, glued in a glue applicator 23, and used as a core layer 28. Urea resin is fed into the glue applicator. The resulting mat is pressed in a hot press 30 and sent through a board cooler 31 to give a finished panel.

As pointed out, the resin glue mix, preferably a urea formaldehyde glue mix, is added to the chips by applicators 23 and 24. The amount of resin glue mix used is about 2% to 12%, such as about 8% by weight based on the weight of the dry chips. Core chips impregnated as described are introduced onto a caul at layers 27, 28 and 29.

The board is then hot pressed at hot press 30. The pressing conditions will vary somewhat depending upon operating factors. If the board be, for example, at 0.7g/cc density ⅜inch panel, the temperature would be about 275° F to 360° F, such as about 340° F. The pressure is about 200 to 300 psi, such as about 250 psi for a time period of about 5 to 20 minutes, such as about 10 minutes. The board is then dry cooled in board cooler 31 and removed as a finished product.

The borate and sulfuric acid are preferably mixed with water to give a 20% to 50%, such as a 35% by weight solution. The amount of borate used as compared to the sulfuric acid used is to give a weight ratio in the range of 52parts of anhydrous borax to 15 to 25 parts, preferably 21 parts of 96% acid. As mentioned, it is important that the pH of the solution be below about 6.5 in the range of about 4.0 to 6.0, such as about 5.25.

The amount of boron compound-sulfuric acid solution used based by weight on the dry flakes is in the range of about 10% to 40%, preferably about 15% to 35%, such as about 25%.

In order to further illustrate the invention, the following example is given.

EXAMPLE:

A 1:1 mixture of white fir and Douglas fir planer shavings was sprayed with a 30% solids solution of fire retardant consisting of 100 parts of sodium tetraborate decahydrate and 21 parts of 96% $H_2SO_4$ in 122 parts of water. The solution was heated to 170° F before spraying, to insure solution of the materials and to aid penetration into the wood. A total of 25 parts of fire retardant solids per 100 parts of dry wood was obtained. The treated wood particles were then dried to a moisture content of from 3 to 7% and sprayed with a commercial particleboard resin consisting of urea formaldehyde condensates and ammonium sulfate catalyst. The level of resin used was 8% based on total resin solids to dry, treated wood.

The glued material was then spread to form a mat and pressed at 340° F for ten minutes to give a particleboard having a density of 0.70 g/cc and a thickness of ⅜inch. This board was then cut into three sections 21 inch × 96 inch and tested in accordance with ASTM E84-68 25′tunnel test. Test results gave a flame spread rating of 20 with a smoke rating of 0; this is a Class I rating.

What is claimed is:

1. A process for manufacturing fire resistant particleboard, comprising the steps of:
   a. spraying wood chips having a moisture content of 125–150% of the weight of the dry wood chips, with an aqueous solution of a borate and sulfuric acid heated to a temperature of about 150°–225° F., said aqueous solution having a pH of about 4.0–6.0;
   b. storing said sprayed wood chips for a stand time of approximately 10–20 minutes to permit said chips to become thoroughly impregnated and saturated with said aqueous solution;
   c. drying said impregnated wood chips;
   d. applying a urea-formaldehdye adhesive to said impregnated wood chips in an amount in the range of about 2% to 12% by weight based on the dry weight of the wood chips; and
   e. consolidating the wood chips under heat and pressure to form the fire-resistant wood particleboard.

2. A process as defined by claim 1 wherein said borate is borax ($Na_2B_4O_7 \cdot X H_2O$) wherein X has a value selected from the group consisting of 0, 5 and 10.

3. A process as defined by claim 1 wherein the amount of aqueous solution sprayed onto the wood chips is in the range of approximately 10% to 40% by weight based on the weight of the dry wood content of the wood chips.

* * * * *